United States Patent [19]

Rozzi

[11] Patent Number: 5,526,140

[45] Date of Patent: Jun. 11, 1996

[54] EMULATION OF A HALFTONE PRINTED IMAGE ON A CONTINUOUS-TONE DEVICE

[75] Inventor: William A. Rozzi, West Lakeland Township, Minn.

[73] Assignee: Minnesota Mining and Manufacturing Company, St. Paul, Minn.

[21] Appl. No.: 398,516

[22] Filed: Mar. 3, 1995

[51] Int. Cl.$^6$ .............................. H04N 1/23; H04N 1/46
[52] U.S. Cl. ............................................ 358/535; 358/536
[58] Field of Search ............... 348/32–35; 358/456–459, 358/534–536, 298

[56] References Cited

U.S. PATENT DOCUMENTS

| | | | |
|---|---|---|---|
| 3,972,066 | 7/1976 | Seki et al. | 358/76 |
| 4,500,919 | 2/1985 | Schreiber | 358/78 |
| 4,691,229 | 9/1987 | Colditz et al. | 358/76 |
| 4,769,696 | 9/1988 | Utsuda et al. | 358/80 |
| 4,958,220 | 9/1990 | Alessi et al. | 358/76 |
| 5,296,947 | 3/1994 | Bowers | 358/527 |

*Primary Examiner*—Stephen Brinich
*Attorney, Agent, or Firm*—Gary L. Griswold; Walter N. Kirn; Steven J. Shumaker

[57] ABSTRACT

A system and method for representing a multi-color, halftone image on a multi-color, continuous-tone device can be configured to employ an approximation technique for determining areas of overlap regions produced by adjacent device spots in a printed halftone image based on a halftone device model. The approximation technique enables consideration of the effects of a variety of halftone device characteristics such as addressability, device spot size, and color values on the appearance of a printed halftone image. The system and method can be configured to employ the approximation technique in a manner that also enables consideration of the effect of misregistration between color separations on the appearance of a printed halftone image. As an alternative, the system and method can be configured to employ a geometrical abstract that effectively centers device spots on the corners of addressable units. This "corner-centered" addressing enables a computationally faster calculation of overlaps when used with either the approximation technique or an analytical technique based on geometric relationships, particularly for device spot diameters between a factor of $\sqrt{2}$ and 2 of the addressability of the halftone device. Finally, the system and method may incorporate a technique for scaling the addressability of color values representative of the halftone printed image without introducing significant artifacts.

42 Claims, 6 Drawing Sheets

EMULATION OF A HALFTONE PRINTED IMAGE ON A CONTINUOUS-TONE DEVICE

FIELD OF THE INVENTION

The present invention relates generally to multicolor, halftone printing technology and, more particularly, to techniques for proofing multi-color, halftone images prior to printing.

DISCUSSION OF RELATED ART

In a multi-color, halftone printing process, an original image is scanned through color filters to form a set of continuous-tone color separations. Each of the color separations represents intensities of one of the separated colors at a plurality of pixel locations within the original image. The continuous-tone color separations are processed using a half-tone screening system to produce a set of halftone color separations in the form of bitmaps. Each of the color separation bitmaps represents the bi-level condition of a separated color at a plurality of addressable units. The addressability of the color separation bitmaps ordinarily is much higher than the addressability of the continuous-tone color separations because several bi-level, addressable units are used to represent the intensity at a single continuous-tone pixel location.

The color separation bitmaps can be used to form halftone printing plates or to control a halftone printing mechanism such as a thermal mass-transfer device. In either case, the addressable units defined by the color separation bitmaps are imaged on a printing substrate by deposition of device spots carrying colorants that correspond to the separated colors. The device spots typically are sized somewhat larger than the addressable units in order to provide a degree of partial overlap that prevents the appearance of gaps between adjacent spots in areas of solid color. In the printing process, the device spots specified by each color separation bitmap are deposited on top of one another in substantial registration. The human eye integrates the superimposed colors of the device spots to form a representation of the original continuous-tone image. The deposition of differently colored device spots on top of one another produces a subtractive blending of the colors on the printing substrate. The blending occurs not only between device spots deposited on top of one another, however, but also between adjacently formed device spots due to the partial overlap caused by the spot sizes. As a result, for N separated colors, the device spots are capable of forming $2^N$ different colors within each addressable unit.

To ensure that the combination of color separations will produce an acceptable representation of the original image, a printing technician normally prepares one or more "proofs" before setting up the halftone printing device for a high-volume run. The preparation of a proof enables the technician to evaluate a representation of the final, printed image in order to adjust or correct the color separations, if necessary. Technicians frequently prepare a proof by printing a representation of the continuous-tone color separations on a continuous-tone printer, or displaying a representation of the continuous-tone color separations on a color monitor. In either case, the resulting proof is only a representation of the continuous-tone color separations, and therefore may have an appearance different from that of the ultimate halftone printed image. Continuous-tone proofing devices typically are less expensive than available halftone proofing devices, in terms of both hardware and materials, and therefore can be more attractive when cost is a significant concern.

With a color monitor, the proof is prepared by converting the continuous-tone color separations into a lower resolution image file matching the addressability of the monitor. The image file then is used to modulate the intensities of red, green, and blue phosphor elements associated with each pixel to produce a range of continuous-tone colors. Similarly, for preparation of a proof on a continuous-tone printer, the continuous-tone color separations are converted into a lower resolution image file that is used to control the amounts of different colorants deposited as device spots at locations on the printing substrate. The varying amounts of the colorants deposited on the printing substrate produce a range of continuous-tone colors.

Unfortunately, the continuous-tone nature of the above proofing processes fails to reveal details that will appear in the image when printed on a halftone device. In particular, the printed halftone image may contain a variety of visible artifacts that were not present in the original image. The characteristics of the halftone device, such as addressability, device spot size, screening characteristics, and colorants, for example, introduce into the printed halftone image small-scale structures known as "rosettes" and may introduce macroscopic artifacts known as "moiré." Because such geometric effects do not arise until the continuous-tone color separations are converted into color separation bitmaps, however, the typical continuous-tone proofing process will not reveal them. Rosettes and moiré may or may not be objectionable to the viewer, but can produce a noticeable effect on the appearance of the printed halftone image. In addition, the continuous-tone proofing device will not reveal the partial overlaps that can be produced between adjacent device spots due to the spot size of the halftone printing device. Thus, the continuous-tone proof may not show the effects of device spot overlap on the apparent color of an addressable unit on the printing substrate.

Awareness of the effect of halftone device characteristics, such as addressability, device spot size, screening characteristics, and colorants, is important in predicting the appearance of the printed halftone image. As discussed above, however, conventional continuous-tone proofing processes often fail to address such characteristics. Efforts have been made to address at least some of the halftone device characteristics responsible for deviation between the continuous-tone proof and the printed halftone image. For example, U.S. Pat. No. 5,296,947 discloses a proofing system that addresses the effect of overlapping and partially overlapping device spots. This system assigns color values to colors produced by device spot overlaps, and calculates areas of overlap regions produced by adjacent device spots within each addressable unit. The colors produced by each overlap are determined, and the corresponding color values are weighted according to the calculated areas to produce a set of appearance signal values for the addressable unit. The appearance signal values then are used to control corresponding pixels on the color monitor to display a proof.

The system disclosed in U.S. Pat. No. 5,296,947 improves the continuous-tone representation of the printed halftone image by considering the effect of spot size and resulting overlap regions. However, the calculation of the areas of overlap regions necessarily assumes that the device spots produced by the halftone device will be perfectly centered on the addressable units, and that the device spots of different color separations therefore will be in perfect registration with one another. Unfortunately, the above assumptions may or may not be correct, subject to the peculiarities of the particular halftone device to be used. If the assumptions are incorrect, the area calculations used in the disclosed system break down. If the halftone device produces misregistration, the errors in analytical calculations can be drastic.

Further, the system disclosed in U.S. Pat. No. 5,296,947 brings into consideration only a subset of the color overlaps that can be produced in the printed halftone image. Specifically, for a printing device capable of depositing four different colorants, the disclosed system considers only eight potential color overlaps. In a four-colorant printing device, however, it is apparent that $2^4$, or sixteen, different color overlaps are possible with ordinary device spot overlaps. Failure to consider all possible combinations of the different device spot colors introduces color error into the representation of the printed image on the continuous-tone device.

Finally, the system disclosed in U.S. Pat. No. 5,296,947 does not consider the scaling operations that ordinarily must be performed to scale the addressability of the appearance signal values to an addressability appropriate for the continuous-tone device on which the proof is to be displayed. Careful 0 attention to scaling is necessary to avoid the introduction of artifacts into the appearance signal values. Such artifacts can affect the appearance of the proof relative to the ultimate printed image. Thus, despite consideration of overlaps, as disclosed in U.S. Pat. No. 5,296,947, the resulting continuous-tone proof may not accurately model the printed halftone image, in view of the failure to address additional considerations presented by real-world halftone device characteristics.

SUMMARY OF THE INVENTION

The present invention is directed to a system and method for emulating a multi-color, halftone image on a multi-color, continuous-tone device. The system and method can be configured to employ an approximation technique for determining areas of overlap regions produced by adjacent device spots in a printed halftone image based on a halftone device model. The approximation technique enables consideration of the effects of a variety of halftone device characteristics such as addressability, device spot size, screening characteristics, and color values on the appearance of a printed halftone image. The system and method of the present invention can be configured to employ the approximation technique in a manner that also enables consideration of the effect of misregistration between color separations on the appearance of a printed halftone image. As an alternative, the system and method of the present invention can be configured to employ a geometrical abstract that effectively centers device spots on the corners of addressable units. This "corner-centered" addressing abstract can enable a computationally faster calculation of overlaps when used with either the approximation technique or an analytical technique based on geometric relationships, particularly for device spots having diameters between a factor of $\sqrt{2}$ and 2 of the addressability of the halftone device. Finally, the system and method of the present invention may incorporate a technique for scaling the addressability of color values representative of the halftone printed image without introducing significant artifacts.

The advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

As broadly embodied and described herein, the present invention provides a system and method for emulating a halftone printed image on a continuous-tone device, the image being defined by N color separation bitmaps, and the continuous-tone device being capable of producing one of a continuous range of colors at each of a plurality of first addressable units.

In one embodiment, the system and method carry out the steps of (a) constructing a halftone device model defined by a plurality of second addressable units and a plurality of device spots, the device spots being sized larger than the second addressable units such that the device spots produce a plurality of overlap regions within each of the second addressable units 0 when addressed to the second addressable units, (b) addressing the device spots to the second addressable units based on the N color separation bitmaps, wherein each of the device spots is assigned one of N different colors determined by colors associated with the N color separation bitmaps, the device spots forming, with the overlap regions, a maximum of $2^N$ different colors within each of the second addressable units, (c) dividing each of the second addressable units into K addressable sub-units, (d) determining, for each of the $2^N$ different colors, the number of the sub-units in which the respective one of the $2^N$ different colors is formed, (e) dividing, for each of the $2^N$ different colors, the number of the sub-units in which the respective one of the $2^N$ different colors is formed by the total number K of the sub-units, thereby calculating fractional values for each of the $2^N$ different colors, (f) calculating a set of color values for each of the second addressable units based on the fractional values calculated for each of the $2^N$ different colors formed in the respective one of the second addressable units, and (g) controlling the continuous-tone device to produce one of the continuous range of colors at each of the first addressable units based on the set of color values calculated for one or more of the second addressable units, thereby emulating the halftone printed image on the continuous-tone device.

In another embodiment, the system and method carry out the steps of (a) constructing a halftone device model defined by a plurality of second addressable units and a plurality of device spots, wherein each of the second addressable units defines a substantially rectangular area having four corners, wherein each of the device spots is a substantially circular device spot having a radius, wherein each of the device spots, when addressed, has a center substantially centered on one of the corners of one of the second addressable units, and wherein the device spots have sizes greater than sizes of the second addressable units such that the device spots produce a plurality of overlap regions within each of the second addressable units when addressed to the second addressable units, (b) addressing the device spots to the second addressable units based on the N color separation bitmaps, wherein each of the device spots is assigned one of N different colors determined by colors associated with the N color separation bitmaps, the device spots forming, with the overlap regions, a maximum of $2^N$ different colors within each of the second addressable units, (c) dividing each of the second addressable units into a plurality of overlap regions, (d) determining, for each of the second addressable units, the one of the $2^N$ different colors formed within each of the overlap regions in the respective one of the second addressable units, (e) calculating, for each of the second addressable units, fractional values for each of the $2^N$ different colors formed within the overlap regions in the respective one of the second addressable units, the fractional values being calculated based on a ratio of the sums of areas of the respective overlap regions in which the respective one of said $2^N$ different colors is formed to a total area of the respective one of the second addressable units, (f) calculating a set of color values for each of the second addressable units based on the fractional values calculated for each of the $2^N$ different colors formed in the respective one of the second addressable units, and (g) controlling the continuous-tone device to produce one of the continuous range of colors at each of the first addressable units based on the set of color values calculated for one or more of the second addressable units, thereby emulating the halftone printed image on the continuous-tone device.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
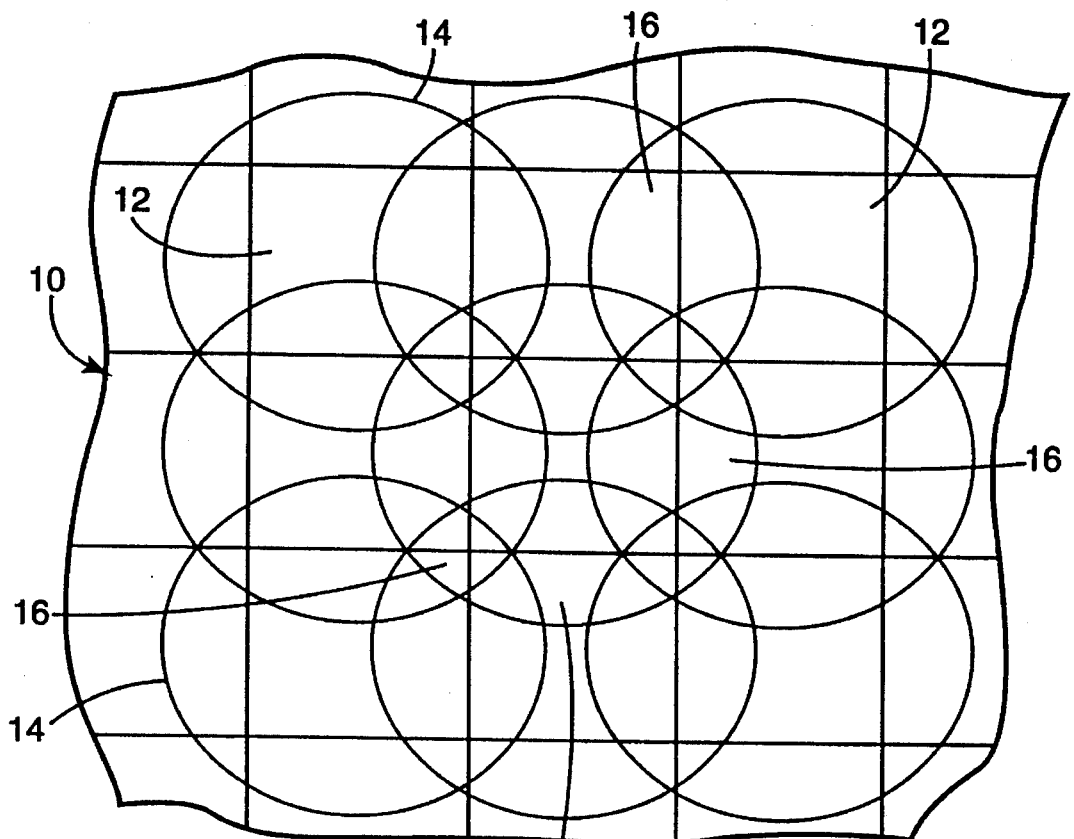
FIG. 1 is a diagram of the output of a conventional multi-color, halftone printing device on a printing substrate, illustrated by the deposition of a plurality of device spots on a plurality of addressable units.

FIG. 1 is a diagram of the output of a conventional multi-color, halftone printing device on a small portion of a printing substrate 10. The halftone printing device generates the output based on the content of a plurality of color separation bitmaps defining a halftone image. The color separation bitmaps define a halftone representation of the bi-level conditions of a set of separated colors at each of a plurality of addressable units within the halftone image. The color separation bitmaps can be formed in a conventional manner by scanning an original image through color filters to form a set of continuous-tone color separations. Each of the continuous-tone color separations contains continuous-tone color values representing intensities of one of the separated colors at a plurality of pixel locations within the original image. The color separation bitmaps are formed by applying a half-tone screening system that converts the continuous-tone color values into a bi-level format, typically having a higher addressability.

The halftone printing device effectively divides printing substrate 10 into a plurality of addressable units 12, and images each of the addressable units 12 based on the content of the color separation bitmaps. The addressable units 12 are imaged by the deposition of a plurality of device spots 14 in a pattern defined by the color separation bitmaps. The device spots 14 carry different colorants that correspond to the separated colors, with the particular color of each device spot being determined by the color of the color separation bitmap by which it was addressed. The device spots 14 shown in FIG. 1 are substantially centered on addressable units 12, but are made larger in size to ensure that no gaps occur between adjacently deposited device spots. As a result, the adjacently deposited device spots 14 produce at least a partial overlap 16 with one another. Deposition of differently colored device spots on the same addressable unit 12 produces a combination of separated colors within the addressable unit. The overlap 16 of adjacently deposited device spots 14 produces additional combinations of separated colors within each addressable unit 12. For N separated colors, device spots 14 are capable of forming a maximum of $2^N$ different colors within each addressable unit 12. If the separated colors correspond to cyan, magenta, yellow, and black, for example, as often is the case for a printing device, device spots 14 could form a maximum of $2^4$, or sixteen, colors from combinations of the separated colors.

Figure 2:
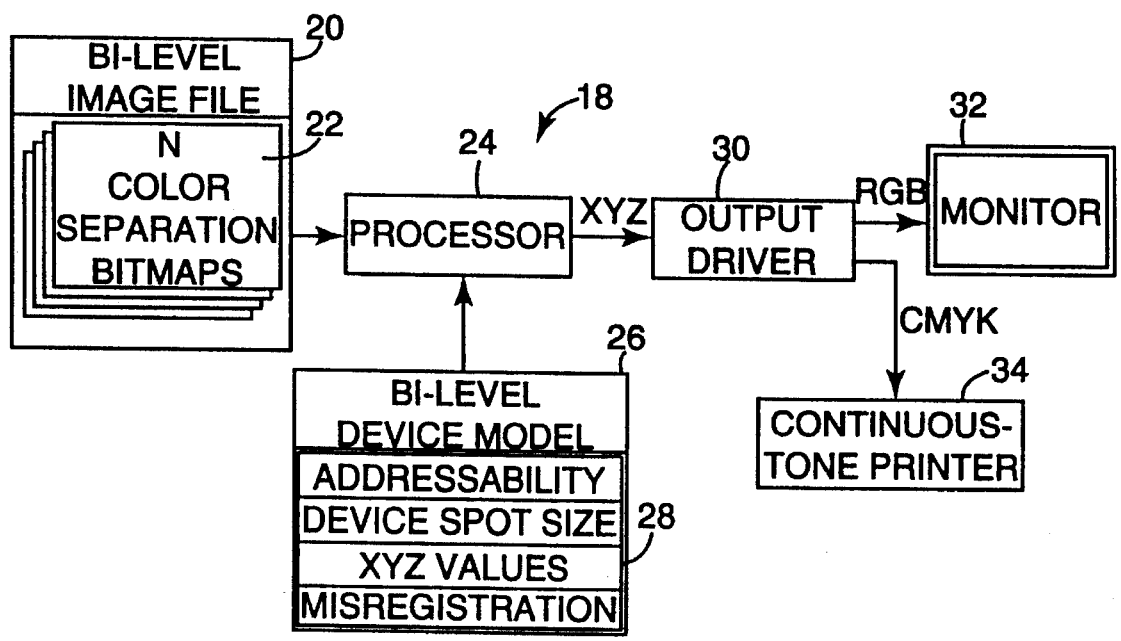
FIG. 2 is a functional block diagram of a system for representing a multi-color, halftone image on a continuous-tone device, in accordance with the present invention.

FIG. 2 is a functional block diagram of a system 18 for emulating a halftone printed image on a continuous-tone device, in accordance with the present invention. The system 18 can be used to implement a method for emulating a halftone printed image on a continuous-tone device, in accordance with the present invention. Accordingly, an example of the method of the present invention will be described herein with reference to the operations carried out by system 18. As shown in FIG. 2, system 18 includes a halftone image file 20 defined by a plurality of color separation bitmaps 22, a processor 24 for accessing the halftone image file and processing the color separation bitmaps to generate continuous-tone color values for preparation of a continuous-tone proof, a halftone device model 26 storing a set of halftone device parameters 28 used by the processor to generate the continuous-tone color values, an output driver 30 for converting the color system of the continuous-tone color values generated by the processor and scaling the addressability of the color values to an appropriate addressability, a color monitor 32 for displaying an image based on the converted and scaled continuous-tone color values, and/or a continuous-tone color printer 34 for printing an image on a printing substrate based on the converted and scaled continuous-tone color values. Both processor 24 and output driver 30 can be realized by a computer workstation programmed to implement a series of operations to be described below, whereas the contents of halftone image file 20 and halftone device model 26 can be stored in a storage device associated with the computer workstation.

The processor 24 constructs halftone device model 26 based on the characteristics of a particular halftone printing device and stores the halftone device model in a record. If image proofs are desired for more than one halftone printing device, or for more than one set of device parameters, processor 24 can construct a plurality of different halftone device models 26 and store them for future retrieval. The halftone device model 26 essentially provides a geometric model of device spots 14 deposited on printing substrate 10 relative to the positions of addressable units 12. The color separation bitmaps 22 determine where each device spot is placed, i.e., the addressable unit to which each device spot is to be addressed. However, halftone device model 26 enables the determination of the areas of overlap regions produced by device spots 14 on printing substrate 10 and the colors resulting from such overlaps.

The processor 24 loads a plurality of halftone device parameters 28 specified by a system user into halftone device model 26. The halftone device parameters 28 include the addressability of the halftone printing device, i.e., the size of each addressable unit 12, and the size of each device spot 14 deposited by the halftone printing device. The halftone device model 26 assumes that each addressable unit 12 has a rectangular surface area, and that each device spot 14 is circular. However, halftone device model 26 may accommodate addressable units 12 and device spots 14 having other more complex shapes. Further, device spots 14 may have different sizes for different color separations. The halftone device parameters 28 also may include, for the particular halftone device, measured tristimulus component values (e.g., CIE XYZ) for each of the $2^N$ colors produced by 10 the separated colors and for each combination of the separated colors. Further, the halftone device parameters 28 may include misregistration values representing a degree of spatial offset occurring between the color separations when the halftone image is printed. The use of misregistration values will be described in detail later in this description with respect to a second embodiment of the present invention.

The processor 24 uses halftone device model 26 to generate a set of continuous-tone color values for each of addressable units 12. The continuous-tone printer 32 and color monitor 34 of system 18 are each capable of producing a continuous range of colors at each of a plurality of addressable units to form a continuous-tone representation of the halftone image based on the continuous-tone color values generated by processor 24. The addressability of continuous-tone printer 32 and color monitor 34 may be less than that defined by color separation bitmaps 22. For this reason, output driver 30 is incorporated as a means to scale the addressability of continuous-tone color values generated by processor 24 to match the addressability of either continuous-tone printer 32 or color monitor 34.

Because the continuous-tone color values generated by processor 24 may be output as CIE XYZ tristimulus values, if desired, output driver 30 also can be configured to convert the color values to a different color space appropriate for either color monitor 32 or continuous-tone printer 34. For example, continuous-tone printer 34 may be configured to deposit a combination of cyan, magenta, yellow, and black colorants at each addressable unit on a printing substrate according to the addressability-scaled color values received from output driver 30, thereby achieving a continuous range of colors. Thus, output driver 30 may be configured to convert CIE XYZ tristimulus values generated by processor 24 into CMYK color values. The color monitor 32 is capable of modulating the excitation of red, green, and blue phosphor elements associated with each addressable unit of a cathode ray tube according to the addressability-scaled color values received from output driver 30 to similarly produce a continuous range of colors. Therefore, output driver 30 also may be configured to convert CIE XYZ tristimulus values generated by processor 24 into RGB color values.

Figure 3:
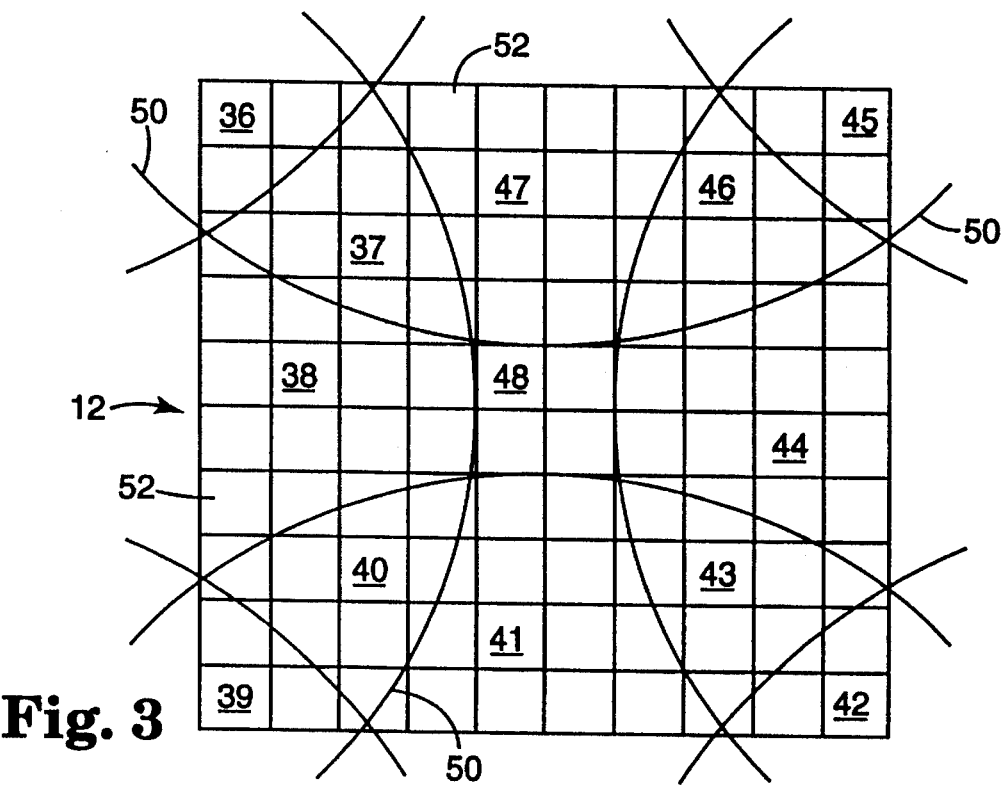
FIG. 3 is a diagram illustrating a plurality of partial device spot overlaps produced in a single addressable unit by the multi-color, halftone output 0 shown in FIG. 1, and the application of an approximation technique for representing a multi-color, halftone image on a continuous-tone device, in accordance with a first embodiment of the present invention.

FIG. 3 is a diagram illustrating a plurality of partial device spot overlap regions 36–48 produced in a single addressable unit 12 by the multi-color, halftone output shown in FIG. 1. FIG. 3 further illustrates the application of an approximation method for emulating a halftone image on a continuous-tone device, in accordance with a first embodiment of the present invention. In FIG. 3, reference numeral 50 designates the arcs of adjacently deposited device spots 14, which intersect with one another within addressable unit 12 to form overlap regions 36–48. To emulate the halftone image on a continuous-tone device, processor 24 accesses halftone image file 20 to address device spots 14 to each of addressable units 12 based on color separation bitmaps 22, thereby modeling deposition of the device spots on a printing substrate. The processor 24 assigns to each of the addressed device spots 14 the color of the particular color separation bitmap 22 by which it was addressed.

As shown in FIG. 3, processor 24 divides each of addressable units 12 into a plurality of K addressable sub-units 52. The processor 24 determines, for each of the $2^N$ different colors and each of addressable units 12, the number of sub-units 52 in which the respective one of the $2^N$ different colors is formed by overlap of device spots 14. The processor 24 then divides, for each of addressable units 12 and for each of the $2^N$ different colors, the number of sub-units 52 in which the respective one of the $2^N$ different colors is formed by the total number K of sub-units. The processor 24 thereby calculates a fractional value for each of the $2^N$ different colors formed in each of addressable units 12. The fractional value approximates the area of the overlap region 36–48 in which the one of the $2^N$ colors is formed relative to the overall area of addressable unit 12. The accuracy of this approximation method increases as the number K of sub-units 52 increases.

The processor 24 calculates a set of color values for each of addressable units 12 based on the fractional values calculated for each of the $2^N$ different colors formed in the respective one of addressable units 12. The generation of the sets of color values is carried out by using the fractional values as weighting coefficients in the Neugebauer equations, as will be described in greater detail later in this specification. Finally, output driver 30 converts the sets of color values to an appropriate color space, and scales the addressability of the sets of color values to an appropriate addressability. The color space-converted and addressability-scaled sets of color values are used to control either color monitor 32 or continuous-tone printer 34 to produce one of a continuous range of colors at each of a plurality of addressable units. The continuous tone device thereby is made to emulate a halftone printed image.

An example of one technique by which the $2^N$ colors formed in addressable units 12 can be ascertained and weighted will now be described with reference to both FIG. 3 and FIG. 4. According to this exemplary technique, processor 24 establishes a prototype addressable unit representative of the overlap regions 36–48 produced by device spots 14. The prototype addressable unit conforms identically to addressable unit 12 shown in FIG. 3. As discussed above, the fractional values for the $2^N$ different colors serve as weighting coefficients in the Neugebauer equations and vary among addressable units 12 according to the data in color separation bitmaps 22. The prototype addressable unit simplifies the calculation of the fractional values, however, by taking advantage of the fact that the device spot overlap regions 36–48 within each addressable unit 12 are identical.

As shown in FIG. 3, for example, the circular arcs 50 that correspond to the circumference of device spots 14 carve out a set of mutually exclusive overlap regions 36–48, which completely partition addressable unit 12. The mutually exclusive overlap regions 36–48 are identical for each addressable unit 12. Therefore, it is necessary to calculate the area of each mutually exclusive overlap region 36–48 only once to compute the areas for every addressable unit 12. The processor 24 calculates the areas of overlap regions 36–48 by dividing the prototype addressable unit into K sub-units 52, as shown in FIG. 3, and determining the number of sub-units within each overlap region 36–48.

The number of sub-units 52 within each overlap region 36–48 is ascertained by assigning a P-bit integer to each of the sub-units. The P-bit integer includes N color fields. Each color field corresponds to one of the N separated colors specified by color separation bitmaps 22. If color separation bitmaps 22 correspond to cyan, magenta, yellow, and black, for example, the P-bit integer will include four (N=4) color fields corresponding to cyan, magenta, yellow, and black, respectively. Each of the color fields includes a plurality of M bits. Thus, the overall P-bit integer includes N×M bits. The M bits in each color field correspond to device spots 14 that overlap some portion of the prototype addressable unit under study. In this example, processor 24 considers the overlap of nine adjacent device spots 14 within the prototype addressable unit 12. Therefore, each of the color fields includes nine (M=9) bits, with each bit corresponding to one of the nine device spots 14. Consequently, in this example, the overall P-bit integer 11 includes thirty-six (N×M=36) bits with four (N=4) color separations and nine (M=9) device spots 14. It is noted, however, that larger device spot diameters may be applicable in different types of halftone devices, requiring consideration of a larger number of device spots 14 in the overlap determination such that M may be larger than nine.

The P-bit integer for each sub-unit 52 is initially equal to zero, with each of the bits being reset. To determine the area of each mutually exclusive overlap region 36–48 in the prototype addressable unit, processor 24 first determines which of device spots 14 overlaps a particular sub-unit 52.

For this exemplary overlap determination, it is assumed that each of device spots 14 is a circular device spot having a radius, and that each of the device spots has a center centered on one of addressable units 12. However, other device spot shapes can be readily accommodated by this approximation technique. The relative centers of addressable units 12 can be determined by reference to the addressability parameter loaded in halftone device model 26. Similarly, the radius of each device spot 14 can be determined by reference to the device spot size parameter loaded in halftone device model 26.

Given the relative center position of addressable units 12, processor 24 determines which of device spots 14 overlaps the particular sub-unit 52 by determining whether the distance of the position of the sub-unit to the center of each of the device spots under consideration is within the radius of the device spots. The position of the particular sub-unit 52 can be determined by its position within the larger addressable unit 12. If the distance between the sub-unit 52 and the center of a device spot 14 is found to be within the radius of the device spot, processor 24 concludes that the device spot overlaps the sub-unit and sets a bit in the appropriate color field of the P-bit integer that corresponds to the device spot. If color separation bitmaps 22 are assumed to be in perfect registration, the bits in each color field will be identical. The color fields will be identical because, for calculation of area in the prototype addressable unit, every device spot 14 is assumed to be addressed by each color separation bitmap 22.

After all device spots 14 and sub-units 52 have been considered, processor 22 searches the K P-bit integers to determine unique P-bit integer patterns. The sub-units 52 in each overlap region 36–48 will exhibit a common P-bit integer pattern that is unique to the particular overlap region due to the unique overlap of device spots 14 occurring in that overlap region. If the circular arcs 50 defined by the circumferences of the device spots carve out T mutually exclusive overlap regions 36–48, then T unique P-bit integer patterns will be found among the K sub-units 52 in the prototype addressable unit. After determining the unique P-bit integer patterns, processor 24 counts the number of sub-units 52 sharing each unique pattern. The processor 24 then establishes a lookup table storing the T unique P-bit integer patterns 19 along with the number of sub-units 52 found to share each pattern. As shown in FIG. 4, the lookup table 11 includes an index field 13 designating the particular one of the T overlap regions referenced, an integer field 15 containing the unique P-bit integer patterns 19 for each overlap region identified in the index field, and a count field 17 indicating the number of sub-units 52 sharing each unique P-bit integer pattern contained in the integer field. The processor 24 applies the contents of lookup table 11 to aid in the computation of the fractional areas occupied by each of the $2^N$ colors within each addressable unit 12.

Figure 4:
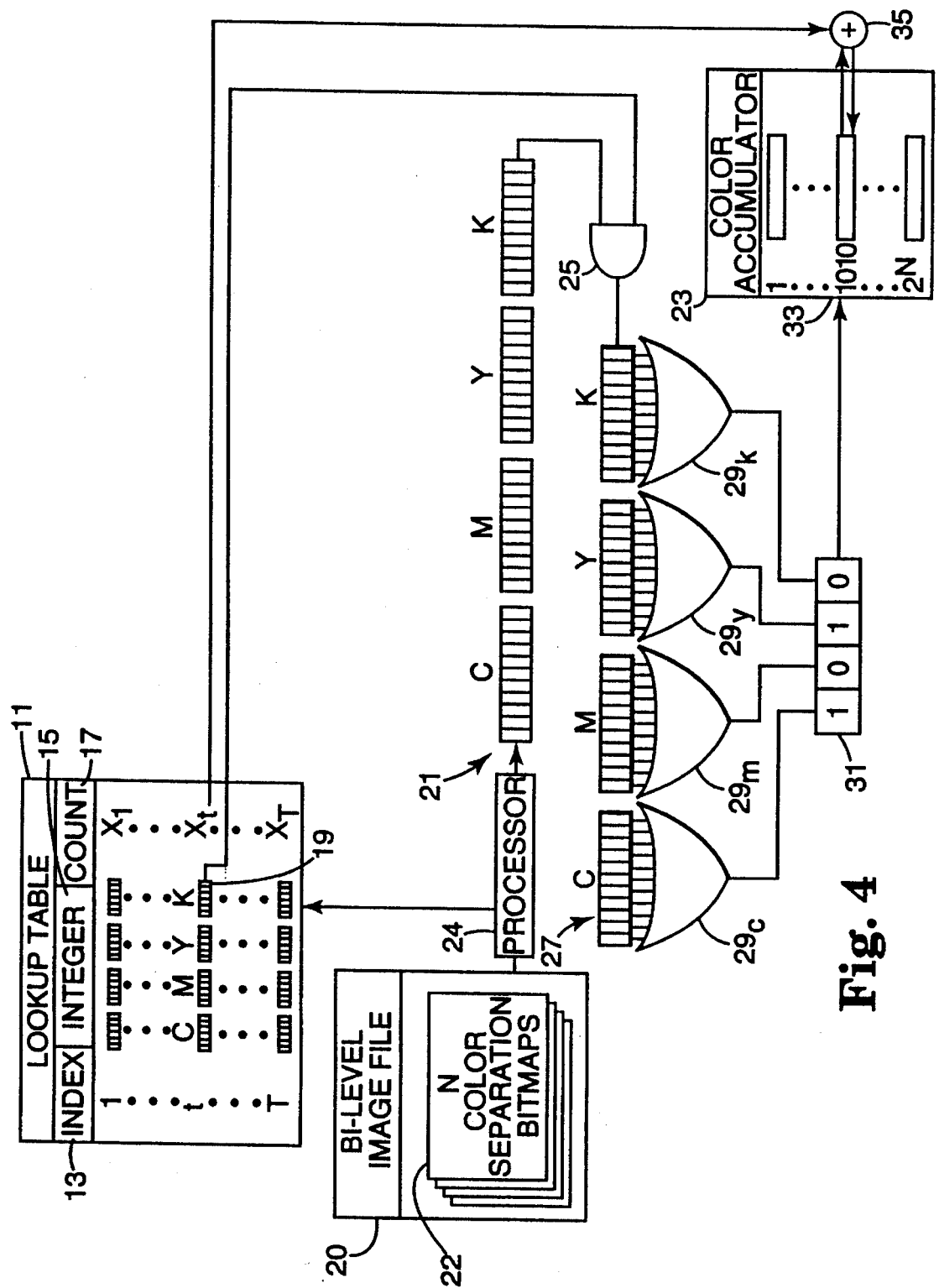
FIG. 4 is a functional block diagram illustrating a technique for determining colors produced by device spot overlaps, in accordance with the present invention.

As shown in FIG. 4, a P-bit integer 21 next is constructed for each addressable unit 12 based on the contents of color separation bitmaps 22 in halftone image file 20. The P-bit integer 21 includes N color fields that again correspond to the N separated colors specified by color separation bitmaps 22. Thus, if a CMYK printing system is assumed, the P-bit integer 21 will include four (N=4) color fields corresponding to cyan, magenta, yellow, and black, respectively. Each of the color fields again includes a plurality of M bits. The M bits chosen are the bits in color separation bitmaps 22 that correspond to the device spots 14 that would overlap the particular addressable unit 12 under study.

The processor 24 allocates storage for $2^N$ integers and sets each integer to zero. As will be described below, the stored integers will function as a color accumulator 23 that accumulates the counts of the number of sub-units 52 that contain each of the $2^N$ colors. The processor 24 then performs the following steps for each unique P-bit integer pattern 19 contained in lookup table 11. First, processor 24 applies a bitwise AND operator to the unique P-bit integer pattern 19 and the P-bit integer pattern 21 specified for the particular addressable unit 12 by color separation bitmaps 22, as indicated by AND gate 25. The bitwise AND operation forms a new P-bit integer pattern 27. The processor 24 then applies an OR operator to the bits in each of the M-bit color fields in the resulting P-bit integer pattern 27, as indicated by OR gates $29_C$, $29_M$, $29_Y$, $29_K$, to determine which colors of device spots 14 are present in overlap region t, which corresponds to the unique P-bit integer pattern 19 under consideration. The output of the OR operator forms an N-bit integer 31 representative of the one of the $2^N$ colors formed in the particular overlap region t. The processor 24 increments the integer 33 in color accumulator 23 that corresponds to the color indicated by the N-bit integer. The integer 33 in color accumulator 23 is incremented by the number of sub-units 52 indicated in the count field 17 of lookup table 11 for the particular overlap region t, as indicated by summer 35. After all T unique P-bit integer patterns in lookup table 11 have been processed, each of the $2^N$ integers in accumulator 23 is divided by K, the total number of sub-units 52.

The resulting $2^N$ quotients are the desired fractional values that are to be used in the Neugebauer equations to compute the color of the addressable unit 12 under study. The fractional value provides an approximation of the size of the overlap region in which the particular color is formed relative to the overall area of the addressable unit. The processor 24 calculates a set of color values for the respective addressable unit 12 based on the fractional values calculated for each of the $2^N$ different colors formed in the addressable unit. Specifically, processor 24 multiplies each of the tristimulus component values loaded in halftone device model 26 by the fractional value calculated for the respective one of the $2^N$ different colors for which the tristimulus component value was measured. The processor 24 then sums the resulting tristimulus component value products according to the Neugebauer equations to calculate each of the tristimulus values for the particular addressable unit 12.

In the CIE XYZ color space, for example, the tristimulus component values loaded in halftone device model 26 will include a set of measured CIE X, Y, and Z tristimulus component values for each of the $2^N$ different colors formed by device spots 14. The processor 24 multiplies each of the X tristimulus component values, Y tristimulus component values, and Z tristimulus component values by the fractional value calculated for the respective one of the $2^N$ different colors for which they were measured, thereby generating X tristimulus component value products, Y tristimulus component value products, and Z tristimulus component value products. The processor 24 then sums the X tristimulus component value products to calculate an X tristimulus value, sums the Y tristimulus component value products to calculate the Y tristimulus value, and sums the Z tristimulus component value products to calculate the Z tristimulus value. Thus, the above calculations are performed according to the standard Neugebauer equations and can be represented by the following expressions:

$$X = A_1 X_1 + A_2 X_2 + A_3 X_3 + \ldots + A_L X_L$$

$$Y = A_1 Y_1 + A_2 Y_2 + A_3 Y_3 + \ldots + A_L Y_L$$

$$Z = A_1 Z_1 + A_2 Z_2 + A_3 Z_3 + \ldots + A_L Z_L$$

where $X_1$–$X_L$ represent the tristimulus X component values measured for each of the $2^N$ different colors, $Y_1$–$Y_L$ represent the tristimulus Y component values measured for each of the $2^N$ different colors, $Z_1$–$Z_L$ represent the tristimulus Z component values measured for each of the $2^N$ different colors, $A_1$–$A_L$ represent the fractional values calculated for each of the $2^N$ different colors within a particular addressable unit 12, and $L = 2^N$.

The processor 24 repeats the operations described above to generate a set of color values for each of addressable units 12. Although the resulting color values provide continuous-tone values for each of addressable units 12, the color space of the color values will not match that of the continuous-tone device on which the halftone image is to be emulated. For example, color monitor 32 requires red, green, and blue color values to modulate the excitation of red, green, and blue phosphor elements, whereas continuous tone printer 34 may require cyan, magenta, yellow, and black color values to control the amounts of cyan, magenta, yellow, and black colorants deposited on the printing substrate. For this reason, output driver 30 is configured to receive the XYZ color values generated by processor 24 for each addressable unit 12 and convert them into a color space appropriate for the continuous-tone device selected by a system user. Thus, if the system user desires to emulate the halftone printed image on color monitor 32, output driver 30 converts the XYZ color values into RGB color values. Similarly, if the system user desires to emulate the halftone printed image on continuous-tone printer 34, output driver 30 converts the XYZ color values into CMYK color values. The output driver 30 can carry out the conversions in a conventional manner by reference to lookup tables mapping XYZ color values to corresponding values existing in RGB or CMYK color spaces.

The addressability of the color values generated by processor 24 also will not match that of the continuous-tone device on which the halftone printed image is to be emulated. Rather, the addressability of color monitor 32 and continuous-tone printer 34 ordinarily will be much less than that defined by color separation bitmaps 22. For example, if the device being modeled is a half-tone printing device with 1200 spot per inch resolution and a page size of 8.5 inches (21.59 centimeters) by 11 inches (27.94 centimeters), processor 24 will produce a set of XYZ color values that is 10,200 (8.5×1200) pixels by 13, 200 (11×1200) pixels. For the image defined by the color values to be printed on a low-resolution continuous-tone printer with 300 spot per inch resolution, the addressability of the color values must be scaled by a factor of 0.25. For this reason, output driver 30 also is configured to scale the addressability of the sets of color values to match the addressability of the continuous-tone device selected by the system user.

The output driver 30 may perform the scaling operation by applying one of a plurality of conventional filter kernel functions to scale the addressability of the sets of color values down to an appropriate addressability. As one example, output driver 30 may apply a bicubic filter kernel function to the color values. If output driver 30 uses a bicubic filter kernel function, however, the bicubic filter kernel function should be applied to the color values in at least two passes to avoid the introduction of artifacts due to aliasing caused by improper resampling. The artifacts can result in an inaccurate emulation of the halftone printed image on the continuous-tone device. For example, the artifacts could be misinterpreted as products of the halftone screening system applied to the color separations of the original image. The application of multiple passes of the bicubic kernel function by output driver 30 avoids the introduction of artifacts by preventing aliasing.

The artifacts are caused by a failure to satisfy the Nyquist criterion during scaling. The Nyquist criterion states that the sampling frequency must be greater than or equal to twice the maximum frequency present in the color values to avoid aliasing. The image data generated by processor 24 have an effective sampling frequency $f_{s,in}$, equal to the addressability of color separation bitmaps 22, and are generated in such a manner that the Nyquist criterion is satisfied. The scaling process may be theoretically represented as a reconstruction of the surface defined by the image data generated by processor 24, followed by a resampling of this surface, where the new sampling frequency, $f_{s,out}$, is that of the continuous-tone device. Because $f_{s,out}$ is typically much smaller than $f_{s,in}$, however, it is likely that the Nyquist criterion will no longer be satisfied and aliasing will occur. This particularly true for the types of images generated by the present invention, which have strong high-frequency content due to the emulated halftone structure. The aliasing may be avoided if the reconstructed surface is low-pass filtered before resampling. Low-pass filtering is a technique that attenuates frequencies above some cutoff frequency, and in this application the cutoff frequency would need to be $0.5 \times f_{s,out}$ to satisfy the Nyquist criterion. The low-pass filter selected should not attenuate frequencies below its cutoff frequency in order to preserve as much of the image data as possible.

In practice, the steps of reconstruction of the image surface followed by low-pass filtering and resampling are not performed explicitly but instead are implicit in the application of a filter kernel, such as a bicubic filter kernel. Unfortunately, the low-pass filtering which is implicit in the bicubic kernel is not sufficient to satisfy the Nyquist criterion when the scale factor is less than approximately 0.5. Therefore, to obtain scale factors less than 0.5 it is necessary to devise a custom kernel with the low-pass characteristics required for scaling in one pass, or to apply a bicubic kernel at least two times. To avoid the bicubic kernel's low-pass limitations, output driver 30 makes multiple passes with the bicubic filter kernel function rather than a single pass. Each pass performs part of the overall scaling with a scaling factor high enough to avoid the introduction of artifacts. If an overall scaling of 0.25 is desired, for example, output driver 30 can be configured to make two passes of the bicubic filter kernel function at scaling factors of 0.5 each. The two passes achieve the overall scaling of 0.25, but avoid the introduction of artifacts that could be caused by aliasing if the entire scaling were carried out in a single step.

After scaling and converting the color values, output driver 30 sends them to a buffer for use by either color monitor 32 or continuous-tone printer 34. The color monitor 32 or continuous-tone printer 34, as selected by a system user, then produce one of a continuous range of colors at each of a plurality of addressable units based on the set of addressability-scaled and color-converted color values stored in the buffer, thereby emulating the multi-color, halftone printed image. If color monitor 32 is selected for emulation of the halftone printed image, red, green, and blue converted color values are used to control the excitation of red, green, and blue elements. Similarly, if continuous-tone printer is selected for emulation of the halftone printed image, cyan, magenta, yellow, and black converted color values can be used to control the deposition of cyan, magenta, yellow, and black colorants on a printing substrate.

Figure 5:
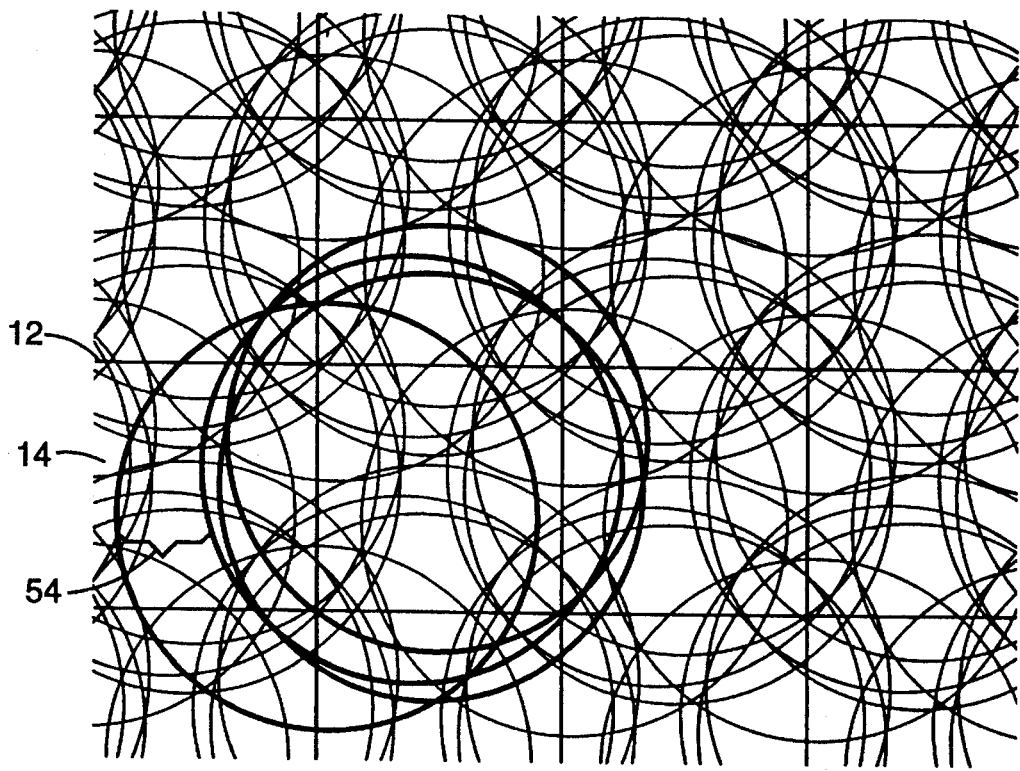
FIG. 5 is a diagram of the output of a multi-color, halftone printing device on a printing substrate, illustrated by the deposition of a plurality of device spots on a plurality of addressable units subject to color separation misregistration.

FIG. 5 is a diagram of the output of a conventional multi-color, halftone printing device on a printing substrate, illustrated by the deposition of a plurality of device spots on a plurality of addressable units subject to a degree of color separation misregistration. As shown in FIG. 5, device spots 14 addressed to addressable units 12 according to different color separation bitmaps 22 are deposited with a spatial offset 54 relative to one another. The spatial offset 54 is peculiar to the particular halftone printing device being modeled, and may have a significant effect on the appearance of the halftone printed image. If it is assumed, for purposes of emulating a halftone printed image, that device spots 14 addressed according to different color separation bitmaps 22 will be deposited in perfect registration with one another, the resulting proof will not accurately reflect the halftone printed image.

Figure 6:
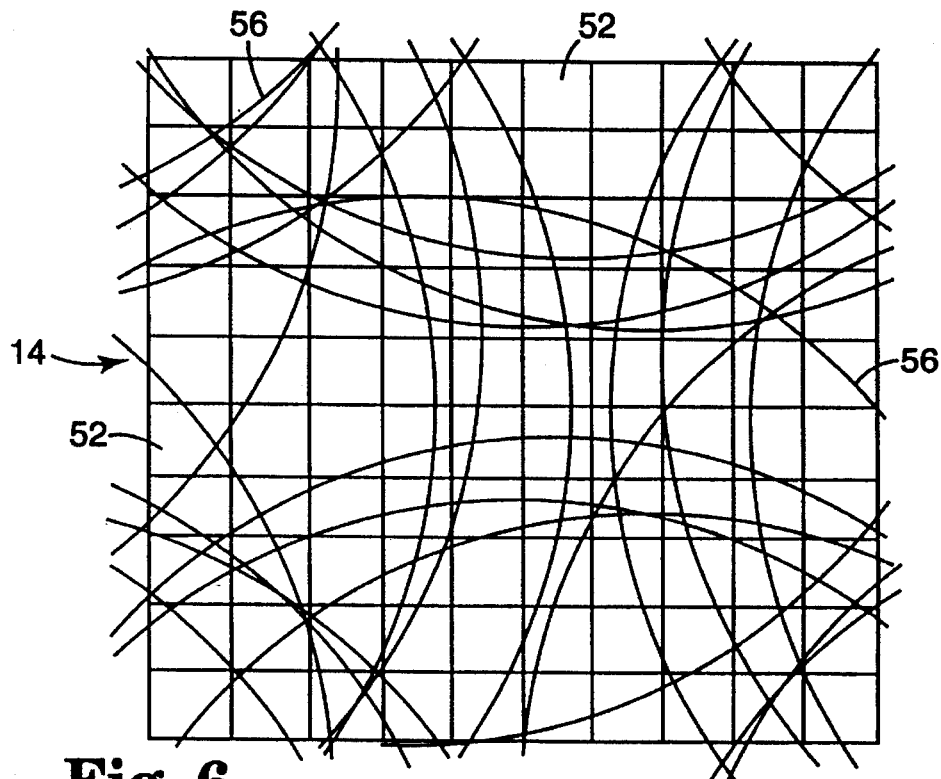
FIG. 6 is a diagram illustrating a plurality of misregistered partial device spot overlaps produced in a single addressable unit by the multi-color, halftone output shown in FIG. 5, and the application of an approximation technique for representing a misregistered, multi-color, halftone image on a continuous-tone device, in accordance with a second embodiment of the present invention.

FIG. 6 is a diagram illustrating a plurality of misregistered partial device spot overlap regions produced in a single addressable unit 12 by the multi-color, halftone output shown in FIG. 5. FIG. 6 further illustrates the application of an approximation technique for emulating a misregistered, multi-color, halftone printed image on a continuous-tone device, in accordance with a second embodiment of the present invention. In FIG. 6, reference numeral 56 designates the arcs of adjacently deposited device spots 14, which intersect with one another within addressable unit 12 to form overlap regions. The approximation technique of this second embodiment substantially corresponds to the approximation technique of the first embodiment, described with reference to FIG. 3, but further includes consideration of the spatial offsets introduced by misregistration of the printed color separations. Specifically, halftone device model 26 is configured, in accordance with this second embodiment, to include a misregistration parameter representing any degree of misregistration between color separations, as specified by a system user for a particular halftone printing device. The system user may desire to investigate the effect of color shifts that could be produced by a printing press that exhibits variations in registration throughout the press run. Therefore, the system user may specify different misregistration parameters to be loaded into halftone device model 26 for purposes of comparing color shift effects. The misregistration parameter incorporated in halftone device model 26 is represented by a set of two-dimensional spatial offsets for each of color separation bitmaps 22 relative to a home position corresponding to perfect registration.

With reference to FIG. 6, processor 24 divides each of addressable units 12 into a plurality of K addressable sub-units 52, as in the approximation technique of the first embodiment. Further, like the approximation technique of the first embodiment, processor 24 determines, for each of the $2^N$ different colors and each of addressable units 12, the number of sub-units 52 in which the respective one of the $2^N$ different colors is formed by overlap of device spots 14. The processor 24 then divides, for each of addressable units 12 and for each of the $2^N$ different colors, the number of sub-units 52 in which the respective one of the $2^N$ different colors is formed by the total number K of sub-units. The processor 24 thereby calculates a fractional value for each of the $2^N$ different colors formed in each of addressable units 12. The fractional value approximates the area of the overlap region 36–48 in which the one of the $2^N$ colors is formed relative to the overall area of addressable unit 12.

The above process requires processor 24 to determine which of the adjacently deposited device spots 14 overlaps the particular sub-unit 52 in the prototype addressable unit, and the separated color assigned to the overlapping device spots. For this overlap determination, it is again assumed that each of device spots 14 is a circular device spot having a radius. Due to the misregistration, however, it cannot be assumed that each of device spots 14 is centered on one of addressable units 12. Although the relative centers of each of addressable units 12 and the radius of each of device spots 14 can be determined by reference to the addressability and device spot size parameters, respectively, loaded in halftone device model 26, processor 24 must recalculate the center of each of the device spots due to the misregistration.

The processor recalculates the center of each device spot 14 by adjusting it according to the two-dimensional spatial offset specified by the misregistration parameter loaded in halftone device model 26. Because the color separations are misregistered relative to one another, processor 24 must apply to each device spot 14 the spatial offset specified for the particular color separation bitmap 22 by which it was addressed. Once the center has been recalculated for each of the adjacently deposited device spots 14 based on the offset, processor 24 determines which of the device spots overlap the sub-unit by determining whether a distance of the sub-unit to the recalculated center of each of the device spots is within the radius of the respective device spot. After recalculating the centers, the approximation technique of this second embodiment is completed in a manner identical to the approximation technique described above with respect to FIG. 3 and FIG. 4.

Figure 7:
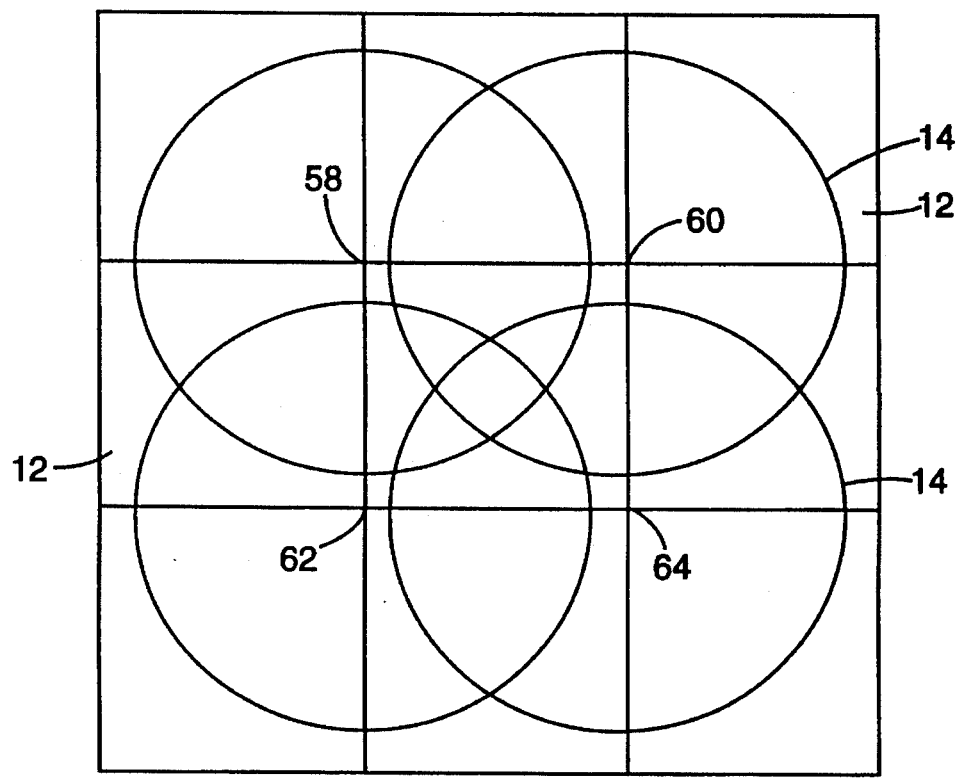
FIG. 7 is a diagram of the deposition of a plurality of device spots on a plurality of addressable units, in accordance with the present invention, illustrated by the addressing of the device spots to the corners of the addressable units.

FIG. 7 is a diagram of the deposition of a plurality of device spots 14 on a plurality of addressable units 12. Unlike techniques whereby device spots 14 are assumed to be substantially centered on addressable units 12, FIG. 7 illustrates the use of a geometrical abstract, in accordance with the present invention, whereby the device spots are assumed to be centered on corners 58, 60, 62, 64 of an addressable unit. This "corner-centered" addressing serves as a computational tool for processor 24 that may reduce the complexity of the overlap calculations. Specifically, the corner-centered addressing of FIG. 7 produces the same number of overlap regions as are produced by unit-centered addressing, but requires consideration of a lesser number of adjacently deposited device spots 14 in determining overlap regions.

Figure 8:
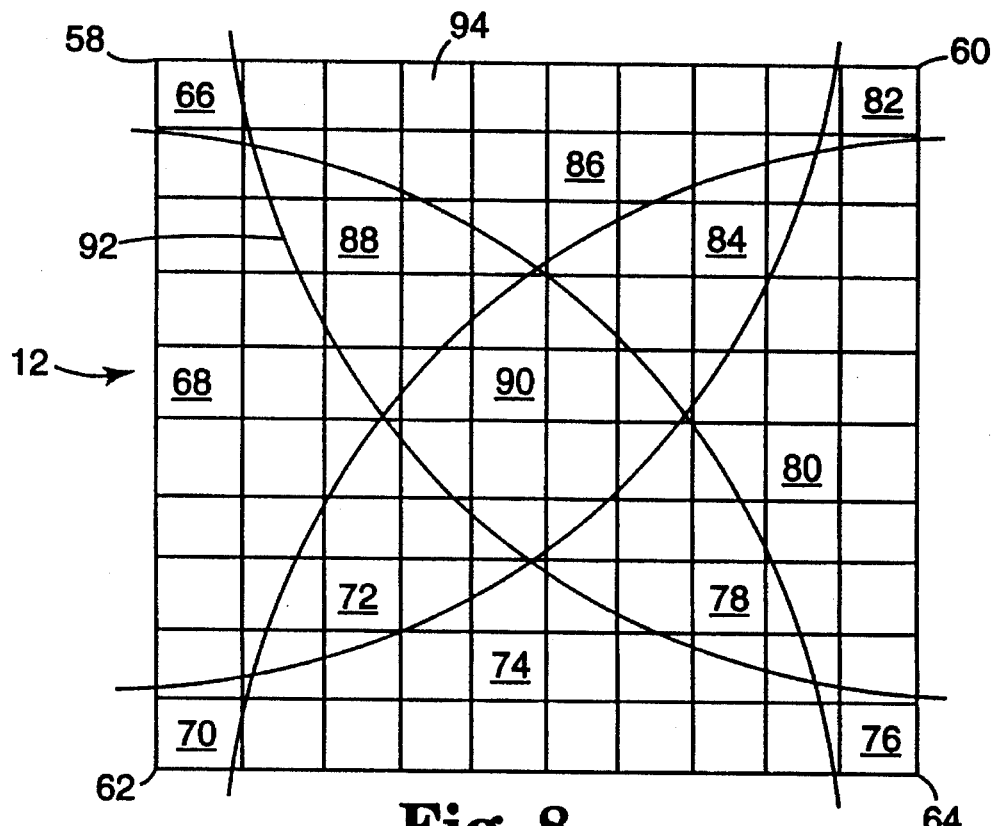
FIG. 8 is a diagram illustrating a plurality of partial device spot overlaps produced by the multi-color, halftone output shown in FIG. 7, and the application of an approximation method for representing a multi-color, halftone image on a continuous-tone device, in accordance with a third embodiment of the present invention.

FIG. 8 is a diagram illustrating a plurality of partial device spot overlap regions 66–90 produced by the corner-centered addressing of FIG. 7. FIG. 8 further illustrates the application of an approximation method for emulating a multi-color, halftone printed image on a continuous-tone device, in accordance with a third embodiment of the present invention. In FIG. 8, reference numeral 92 designates the arcs of device spots 14 addressed to the corners 58, 60, 62, 64 of addressable unit 12. The arcs 92 intersect with one another within addressable unit 12 to form overlap regions 66–90. The approximation method of this third embodiment substantially corresponds to the approximation method of the first embodiment, described with reference to FIGS. 3 and 4, but assumes that each of device spots 14 is centered on one of the corners 58, 60, 62, 64 of an addressable unit 12.

Thus, in accordance with this third embodiment, processor 24 divides each of addressable units 12 into K addressable sub-units 94, as in the approximation technique of the first embodiment. Further, like the approximation technique of the first embodiment, processor 24 determines, for each of the $2^N$ different colors and each of addressable units 12, the number of sub-units 52 in which the respective one of the $2^N$ different colors is formed by overlap of device spots 14. The processor 24 then divides, for each of addressable units 12 and for each of the $2^N$ different colors, the number of sub-units 52 in which the respective one of the $2^N$ different colors is formed by the total number K of sub-units. The processor 24 thereby calculates a fractional value for each of the $2^N$ different colors formed in each of addressable units 12. The fractional value approximates the area of the overlap region 66–90 in which the one of the $2^N$ colors is formed relative to the overall area of addressable unit 12.

As in the first embodiment, processor 24 determines which of device spots 14 overlaps each sub-unit 52 in the prototype addressable unit, but limits this inquiry only to those device spots 14 addressed to corners 58–62 of addressable unit 12. Because a smaller number of device spots 14 needs to be considered, the determination of spot overlap is computationally less intensive and can be performed more quickly by processor 24. This statement holds true for device spot diameters between a factor of $\sqrt{2}$ and 2 of the addressability of the halftone device. The relative positions of corners 58, 60, 62, and 64 and the radius of each of device spots 14 can be determined by reference to the addressability and device spot size parameters, respectively, loaded in halftone device model 26. Given the relative positions of corners 58, 60, 62, 64 of addressable unit 12, processor 24 determines which of device spots 14 overlaps the respective sub-unit 94 by determining whether a distance of the sub-unit to the corner on which each of the device spots is centered is within the radius of the device spot. After determining which of device spots 14 overlap sub-units 94, the approximation technique of this third embodiment is completed in a manner identical to that of the approximation technique described above with reference to FIG. 3 and FIG. 4.

If misregistration is to be modeled, in accordance with this third embodiment of the present invention, processor 24 is configured to recalculate the centers of each of device spots 14 based on the two-dimensional spatial offset specified by the misregistration parameter loaded in halftone device model 26. As in the second embodiment, described above with reference to FIG. 6, it is again assumed that each of device spots 14 is a circular device spot having a radius. Due to the misregistration, however, it cannot be assumed that each of device spots 14 is centered on corners 58, 60, 62, 64 of the addressable unit 12. Rather, processor 24 recalculates the center of each of the device spots 14, and then determines which of the device spots overlap the sub-unit by determining whether a distance of the sub-unit to the recalculated center of each of the device spots is within the radius of the respective device spot.

Figure 9:
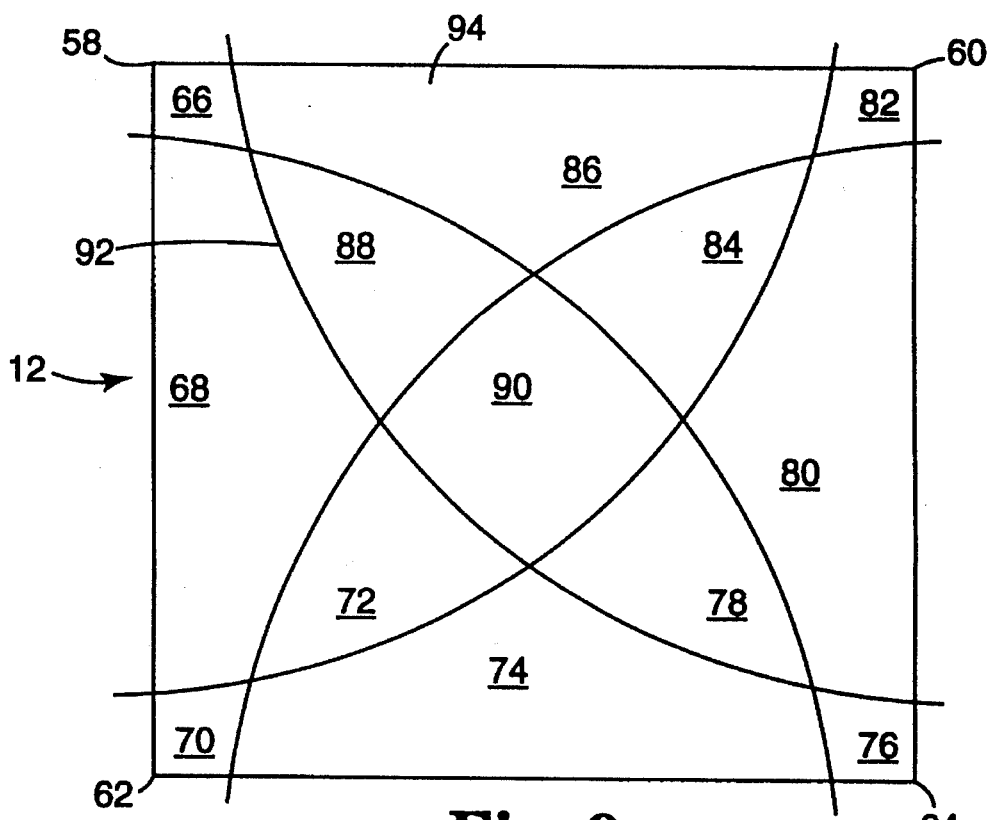
FIG. 9 is a diagram illustrating a plurality of partial device spot overlaps produced by the multi-color, halftone output shown in FIG. 7, and the application of an analytical method for representing a multi-color, halftone image on a continuous-tone device, in accordance with a fourth embodiment of the present invention.

FIG. 9 is a diagram illustrating a plurality of partial device spot overlap regions 66–90 produced by the multi-color, halftone output shown in FIG. 7, and the application of an analytical method for emulating a multi-color, halftone printed image on a continuous-tone device, in accordance with a fourth embodiment of the present invention. In FIG. 9, reference numeral 92 designates the arcs of device spots 14 addressed to the corners 58, 60, 62, 64 of addressable unit 12. FIG. 9 substantially corresponds to FIG. 8, but does not include the division of addressable unit 12 into a plurality of sub-units 94, as would be performed for the approximation technique of the third embodiment. Rather, FIG. 9 represents the calculation of device spot overlap regions according to an analytical technique that relies on geometrical relationships between the overlapping device spots 14. The system and method of the present invention, in accordance with the analytical technique of this fourth embodiment, substantially corresponds to the first embodiment, but differs in the manner in which the overlap regions, and thus the fractional values, are calculated.

Figure 10:
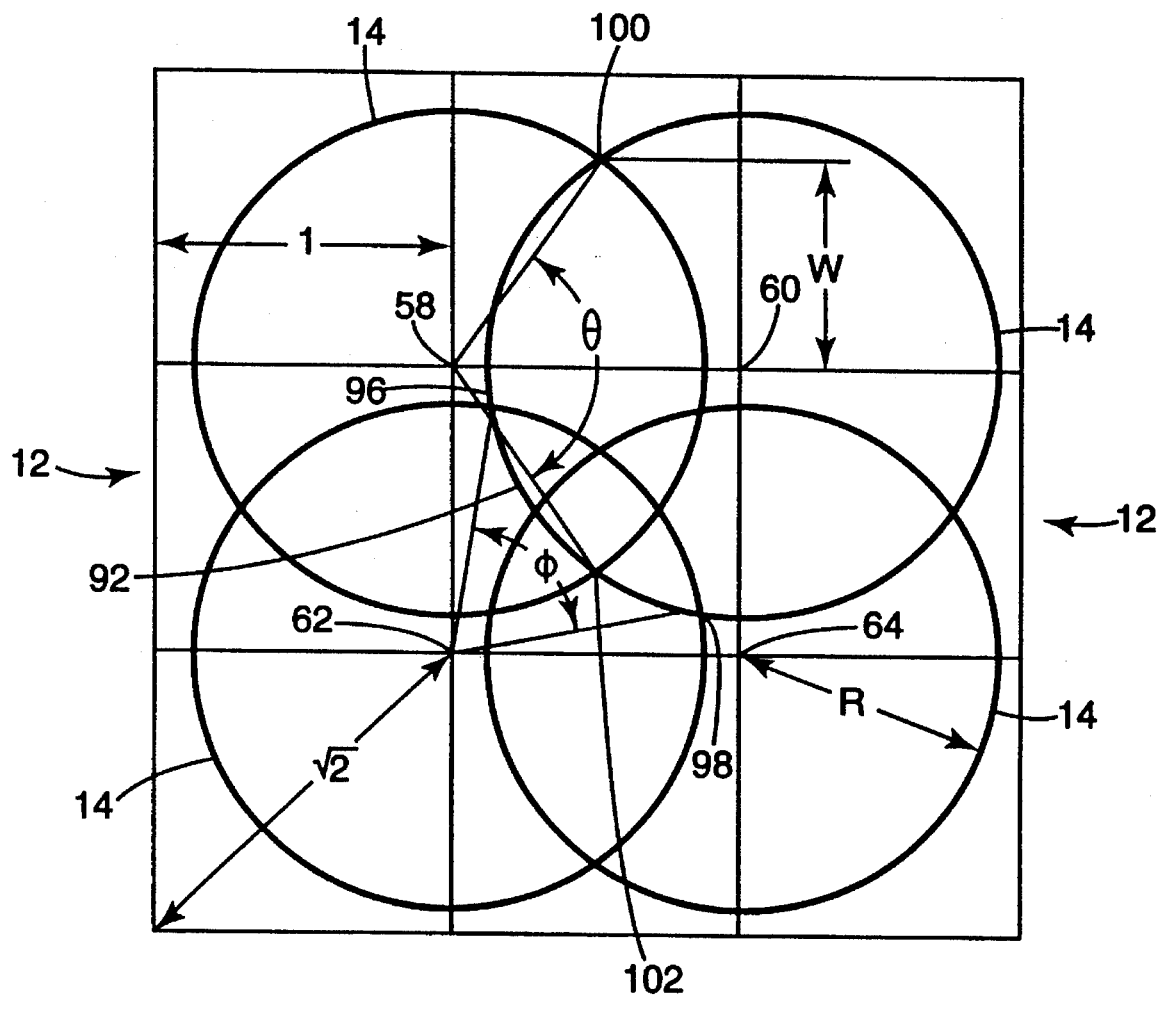
FIG. 10 is a diagram illustrating a set of geometric relationships between the adjacent device spots shown in FIG. 9, as utilized by the analytical method of the fourth embodiment of the present invention.

FIG. 10 is a diagram illustrating a set of geometric relationships between the adjacent device spots 14 centered on corners 58, 60, 62, 64 of addressable unit 12 to form the device spot overlap regions 66–90 shown in FIG. 9. The geometric relationships enable straightforward calculation of the areas of overlap regions 66–90 for cases in which the ratio of device spot diameter to addressability is between $\sqrt{2}$ and 2 and no misregistration exists. It is noted, however, that similar calculations can be readily made for ratios greater than 2. With reference to FIG. 10, the geometric relationships can be described in terms of a parameter $\phi$ representing the angle defined by intersection points 96, 98, and corner 62, a parameter $\theta$ representing the angle defined by intersection points 100, 102, and corner 58, w representing the height of intersection point 100 relative to the height of the addressable unit, R representing the radius of each device spot, 1 representing the unit dimension of each addressable unit, and $\sqrt{2}$ representing the diagonal dimension of each addressable unit.

The relationships between the parameters can be represented as follows:

$$w = \sqrt{(R^2 - 1/4)},$$

$$\theta = 2\arcsin(w/R), \text{ and}$$

$$\phi = 2\arccos[1/(R\sqrt{2})].$$

Given the value of R, and after deriving w, $\theta$, and $\phi$, the areas of overlap regions 66–90, shown in FIG. 10, can be represented as:

| Overlap Number | Area |
|---|---|
| 66, 70, 76, 82 | a |
| 72, 78, 84, 88 | b |
| 68, 74, 80, 86 | c |
| 90 | d | where:

$a = [1 + (\phi - \pi/2)R^2 - \sqrt{(2R^2 - 1)}]/2,$ $b = (\pi/2 + \phi/2 - \theta)R^2 - [1 + \sqrt{(2R^2 - 1)}]/2 + w,$ $c = (\theta/2 - \phi)R^2 + \sqrt{(2R^2 - 1)} - w/2,$ and $d = (2\theta - \pi)R^2 + 1 - 2w.$ To emulate a halftone printed image on a continuous-tone device, in accordance with this fourth embodiment, processor 24 divides each of addressable units 12 into overlap regions 66–90 produced by the overlap of device spots 14 centered on corners 58, 60, 62, 64 of the respective addressable unit. The processor 24 ascertains which of the device spots 14 overlaps each overlap region 66–90 by reference to the geometric abstract, and then determines the one of the $2^N$ different colors formed within each of the overlap regions based on a combination of the colors carried by the overlapping device spots. As in the first embodiment, processor 24 determines the colors of particular device spots 14 by reference to the color of the color separation bitmap 22 by which it was addressed.

The processor 24 then calculates, for each of addressable units 12, the fractional values for the $2^N$ different colors formed within each overlap regions 66–90. The fractional values are calculated by first calculating the area of each overlap region 66–90 for a prototype addressable unit according to the equations above, and then dividing each area by the total area of the addressable unit 12. Thus, the fractional value for each of the $2^N$ different colors formed within overlap regions 66–90 in each of addressable units 12 is calculated based on a ratio of the sums of the areas of the overlap regions in which the respective one of the $2^N$ different colors is formed to a total area of the addressable unit. After calculating the fractional values, processor 24 calculates a set of color values for the addressable units by multiplying the fractional values for each color by tristimulus component values measured for that color, and summing the resulting tristimulus component product values according to the Neugebauer equations, as in the first embodiment.

The above equations can be readily adapted for non-circular device spots. For example, elliptical device spots could be addressed to rectangular addressable units. If the shorter dimension of the rectangular addressable unit was assigned a value of 1 and the longer dimension was assigned a value of s, the area of the addressable unit would be 1×s=s, and all overlap regions 66–90 would be scaled by the same factor s. When the areas of the overlap regions 66–90 are divided by the total area s of the addressable unit 12, however, the fractional values are identical to those produced when circular device spots are used.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A method for emulating a halftone printed image on a continuous-tone device, said image being defined by N color separation bitmaps, and said continuous-tone device being capable of producing one of a continuous range of colors at each of a plurality of first addressable units, the method comprising the steps of:

(a) constructing a halftone device model defined by a plurality of second addressable units and a plurality of device spots, said device spots being sized larger than said second addressable units such that said device spots produce a plurality of overlap regions within each of said second addressable units when addressed to said second addressable units;

(b) addressing said device spots to said second addressable units based on said N color separation bitmaps, wherein each of said device spots is assigned one of N different colors determined by colors associated with said N color separation bitmaps, said device spots forming, with said overlap regions, a maximum of $2^N$ different colors within each of said second addressable units;

(c) dividing each of said second addressable units into K addressable sub-units;

(d) determining, for each of said $2^N$ different colors, the number of said sub-units in which the respective one of said $2^N$ different colors is formed;

(e) dividing, for each of said $2^N$ different colors, the number of said sub-units in which the respective one of said $2^N$ different colors is formed by the total number K of said sub-units, thereby calculating fractional values for each of said $2^N$ different colors;

(f) calculating a set of color values for each of said second addressable units based on the fractional values calculated for each of said $2^N$ different colors formed in the respective one of said second addressable units; and (g) controlling said continuous-tone device to produce one of said continuous range of colors at each of said first addressable units based on the set of color values calculated for one or more of said second addressable units, thereby emulating said halftone printed image on said continuous-tone device.

2. The method of claim 1, wherein said step (d) further includes the steps of:

(d)(i) constructing a prototype addressable unit representing the plurality of overlap regions produced by said device spots within each of said second addressable units;

(d)(ii) determining the number of said sub-units within each of said overlap regions of said prototype addressable unit;

(d)(iii) determining, for each of said second addressable units, the one of said $2^N$ different colors formed in each of the overlap regions of the respective one of said second addressable units; and (d)(iv) determining, for each of said second addressable units, the number of said sub-units in which the respective one of said $2^N$ different colors is formed by reference to the numbers of sub-units determined for the corresponding overlap regions of the prototype addressable unit.

3. The method of claim 2, wherein each of said device spots is substantially circular and has a radius, and each of said device spots has a center substantially centered on one of said second addressable units, said step (d)(ii) including the step of determining which of said device spots overlaps each of said sub-units by determining whether a distance of the respective one of said sub-units to the center of each of a plurality of said device spots centered on adjacent ones of said second addressable units is within the radius of the respective one of said device spots.

4. The method of claim 3, wherein said device model is further defined by a degree of misregistration between said N color separation bitmaps, said misregistration producing a spatial offset between said device spots addressed to said second addressable units, said step (d)(ii) including the step of determining which of said device spots overlaps each of said sub-units by recalculating the center of each of said device spots based on said spatial offset and determining whether a distance of the respective one of said sub-units to the recalculated center of each of a plurality of said device spots centered on adjacent ones of said second addressable units is within the radius of the respective one of said device spots.

5. The method of claim 2, wherein each of said device spots is substantially circular and has a radius, each of said second addressable units is substantially rectangular and has four corners, and each of said device spots has a center substantially centered on one of the corners of one of said second addressable units, said step (d)(ii) including the step of determining which of said device spots overlaps each of said sub-units by determining whether a distance of the respective one of said sub-units to the center of each of a plurality of said device spots centered on the corners of said prototype addressable unit is within the radius of the respective one of said device spots.

6. The method of claim 5, wherein said device model is further defined by a degree of misregistration between said N color separation bitmaps, said misregistration producing a spatial offset between said device spots addressed to said second addressable units, said step (d)(ii) including the step of determining which of said device spots overlaps each of said sub-units by recalculating the center of each of said device spots based on said spatial offset and determining whether a distance of the respective one of said sub-units to the recalculated center of each of a plurality of said device spots centered on the corners of said prototype addressable unit is within the radius of the respective one of said device spots.

7. The method of claim 2, wherein said step (d)(iii) includes determining, for each of said second addressable units, the one of said $2^N$ different colors formed in each of the overlap regions of the respective one of said second addressable units by the steps of determining the one of said N different device spot colors associated with each of the device spots overlapping the respective one of said overlap regions, and determining the one of said $2^N$ different colors formed within the respective one of said overlap regions based on a combination of the N different device spot colors associated with the device spots overlapping the respective one of said overlap regions.

8. The method of claim 1, wherein said step (f) includes calculating said set of color values by using said fractional values as weighting coefficients in the Neugebauer equations.

9. The method of claim 1, wherein said halftone device model is further defined by a set of measured CIE X, Y, and Z tristimulus component values for each of said $2^N$ different colors, and the set of color values calculated in said step (g) for each of said second addressable units is a set of CIE X, Y, and Z tristimulus values, said step (g) further including using said fractional values as weighting coefficients in the Neugebauer equations by the steps of:

multiplying each of the X tristimulus component values, Y tristimulus component values, and Z tristimulus component values by the fractional value calculated for the respective one of said $2^N$ different colors, thereby generating X tristimulus component value products, Y tristimulus component value products, and Z tristimulus component value products;

summing the X tristimulus component value products to calculate the X tristimulus value;

summing the Y tristimulus component value products to calculate the Y tristimulus value; and summing the Z tristimulus component value products to calculate the Z tristimulus value.

10. The method of claim 9, wherein said continuous-tone device is a continuous-tone printer, said printer being capable of producing one of said continuous range of colors at each of said first addressable units by deposition of a plurality of different colorants, wherein said step (g) of controlling said continuous-tone device includes the steps of:

generating colorant values for each of said first addressable units based on the X, Y, and Z tristimulus values calculated for one or more of said second addressable units; and controlling said continuous-tone printer to deposit said different colorants at each of said first addressable units in amounts determined by the colorant values generated for the respective one of said first addressable units.

11. The method of claim 9, wherein said continuous-tone device is a continuous-tone monitor, said continuous-tone monitor being capable of producing one of said continuous range of colors at each of said first addressable units by excitation of differently colored elements associated with each of said first addressable units, wherein said step (g) of controlling said continuous-tone device includes the steps of:

generating element values for each of said first addressable units based on the X, Y, and Z tristimulus values calculated for one or more of said second addressable units; and controlling said continuous-tone monitor to excite said differently colored elements at each of said first addressable units with intensities determined by said element values generated for the respective one of said first addressable units.

12. The method of claim 1, wherein a number of said second addressable units is greater than a number of said first addressable units, said step (g) of controlling said continuous-tone device further comprising the step of applying a filter kernel function to the sets of color values calculated for said second addressable units to scale down an addressability of said sets of said color values to match an addressability of said first addressable units, and controlling said continuous-tone device to produce one of said continuous range of colors at each of said first addressable units based on the resulting scaled-down sets of color values.

13. The method of claim 12, wherein said step of applying said filter kernel function includes the step of applying a bicubic filter kernel function a plurality of times to the sets of color values calculated for said second addressable units.

14. A method for emulating a halftone printed image on a continuous-tone device, said image being defined by N color separation bitmaps, and said continuous-tone device being capable of producing one of a continuous range of colors at each of a plurality of first addressable units, the method comprising the steps of:

(a) constructing a halftone device model defined by a plurality of second addressable units and a plurality of device spots, wherein each of said second addressable units defines a substantially rectangular area having four corners, wherein each of said device spots is a substantially circular device spot having a radius, wherein each of said device spots, when addressed, has a center substantially centered on one of the corners of one of said second addressable units, and wherein said device spots have sizes greater than sizes of said second addressable units such that said device spots produce a plurality of overlap regions within each of said second addressable units when addressed to said second addressable units;

(b) addressing said device spots to said second addressable units based on said N color separation bitmaps, wherein each of said device spots is assigned one of N different colors determined by colors associated with said N color separation bitmaps, said device spots forming, with said overlap regions, a maximum of $2^N$ different colors within each of said second addressable units;

(c) dividing each of said second addressable units into a plurality of overlap regions;

(d) determining, for each of said second addressable units, the one of said $2^N$ different colors formed within each of said overlap regions in the respective one of said second addressable units;

(e) calculating, for each of said second addressable units, fractional values for each of said $2^N$ different colors formed within said overlap regions in the respective one of the second addressable units, the fractional values being calculated based on a ratio of the sums of areas of the respective overlap regions in which the respective one of said $2^N$ different colors is formed to a total area of the respective one of the second addressable units;

(f) calculating a set of color values for each of said second addressable units based on the fractional values calculated for each of said $2^N$ different colors formed in the respective one of said second addressable units; and (g) controlling said continuous-tone device to produce one of said continuous range of colors at each of said first addressable units based on the set of color values calculated for one or more of said second addressable units, thereby emulating said halftone printed image on said continuous-tone device.

15. The method of claim 14, wherein said step (d) of determining the one of said $2^N$ different colors formed within each of said overlap regions includes the steps of determining which of said device spots overlaps the respective one of said overlap regions, determining the one of said N different device spot colors associated with each of the device spots overlapping the respective one of said overlap regions, and determining the one of said $2^N$ different colors formed within the respective one of said overlap regions based on a combination of the N different device spot colors associated with the device spots overlapping the respective one of said overlap regions.

16. The method of claim 14, wherein said step (f) includes calculating said set of color values by using said fractional values as weighting coefficients in the Neugebauer equations.

17. The method of claim 14, wherein said halftone device model is further defined by a set of measured CIE X, Y, and Z tristimulus component values for each of said $2^N$ different colors, and the set of color values calculated in said step (g) for each of said second addressable units is a set of CIE X, Y, and Z tristimulus values, said step (g) further including using said fractional values as weighting coefficients in the Neugebauer equations by the steps of:

multiplying each of the X tristimulus component values, Y tristimulus component values, and Z tristimulus component values by the fractional value calculated for the respective one of said $2^N$ different colors, thereby generating X tristimulus component value products, Y tristimulus component value products, and Z tristimulus component value products;

summing the X tristimulus component value products to calculate the X tristimulus value;

summing the Y tristimulus component value products to calculate the Y tristimulus value; and summing the Z tristimulus component value products to calculate the Z tristimulus value.

18. The method of claim 17, wherein said continuous-tone device is a continuous-tone printer, said printer being capable of producing one of said continuous range of colors at each of said first addressable units by deposition of a plurality of different colorants, wherein said step (g) of controlling said continuous-tone device includes the steps of:

generating colorant values for each of said first addressable units based on the X, Y, and Z tristimulus values calculated for one or more of said second addressable units; and controlling said continuous-tone printer to deposit said different colorants at each of said first addressable units in amounts determined by the colorant values generated for the respective one of said first addressable units.

19. The method of claim 17, wherein said continuous-tone device is a continuous-tone monitor, said continuous-tone monitor being capable of producing one of said continuous range of colors at each of said first addressable units by excitation of differently colored elements associated with each of said first addressable units, wherein said step (g) of controlling said continuous-tone device includes the steps of:

generating element values for each of said first addressable units based on the X, Y, and Z tristimulus values calculated for one or more of said second addressable units; and controlling said continuous-tone monitor to excite said differently colored elements at each of said first addressable units with intensities determined by said element values generated for the respective one of said first addressable units.

20. The method of claim 14, wherein a number of said second addressable units is greater than a number of said first addressable units, said step (g) of controlling said continuous-tone device further comprising the step of applying a filter kernel function to the sets of color values calculated for said second addressable units to scale down an addressability of said sets of said color values to match an addressability of said first addressable units, and controlling said continuous-tone device to produce one of said continuous range of colors at each of said first addressable units based on the resulting scaled-down sets of color values.

21. The method of claim 20, wherein said step of applying said filter kernel function includes the step of applying a bicubic filter kernel function a plurality of times to the sets of color values calculated for said second addressable units.

22. A system for emulating a halftone printed image on a continuous-tone device, said image being defined by N color separation bitmaps, and said continuous-tone device being capable of producing one of a continuous range of colors at each of a plurality of first addressable units, the system comprising:

(a) means for constructing a halftone device model defined by a plurality of second addressable units and a plurality of device spots, said device spots being sized larger than said second addressable units such that said device spots produce a plurality of overlap regions within each of said second addressable units when addressed to said second addressable units;

(b) means for addressing said device spots to said second addressable units based on said N color separation bitmaps, wherein each of said device spots is assigned one of N different colors determined by colors associated with said N color separation bitmaps, said device spots forming, with said overlap regions, a maximum of $2^N$ different colors within each of said second addressable units;

(c) means for dividing each of said second addressable units into K addressable sub-units;

(d) means for determining, for each of said $2^N$ different colors, the number of said sub-units in which the respective one of said $2^N$ different colors is formed;

(e) means for dividing, for each of said $2^N$ different colors, the number of said sub-units in which the respective one of said $2^N$ different colors is formed by the total number K of said sub-units, thereby calculating fractional values for each of said $2^N$ different colors;

(f) means for calculating a set of color values for each of said second addressable units based on the fractional values calculated for each of said $2^N$ different colors formed in the respective one of said second addressable units; and (g) means for controlling said continuous-tone device to produce one of said continuous range of colors at each of said first addressable units based on the set of color values calculated for one or more of said second addressable units, thereby emulating said halftone printed image on said continuous-tone device.

23. The system of claim 22, wherein said means (d) further includes:

(d)(i) means for constructing a prototype addressable unit representing the plurality of overlap regions produced by said device spots within each of said second addressable units;

(d)(ii) means for determining the number of said sub-units within each of said overlap regions of said prototype addressable unit;

(d)(iii) means for determining, for each of said second addressable units, the one of said $2^N$ different colors formed in each of the overlap regions of the respective one of said second addressable units; and (d)(iv) means for determining, for each of said second addressable units, the numbers of said sub-units in which the respective one of said $2^N$ different colors is formed by reference to the number of sub-units determined for the corresponding overlap regions of the prototype addressable unit.

24. The system of claim 23, wherein each of said device spots is substantially circular and has a radius, and each of said device spots has a center substantially centered on one of said second addressable units, said means (d)(ii) including means for determining which of said device spots overlaps each of said sub-units by determining whether a distance of the respective one of said sub-units to the center of each of a plurality of said device spots centered on adjacent ones of said second addressable units is within the radius of the respective one of said device spots.

25. The system of claim 24, wherein said device model is further defined by a degree of misregistration between said N color separation bitmaps, said misregistration producing a spatial offset between said device spots addressed to said second addressable units, said means (d)(ii) including means for determining which of said device spots overlaps each of said sub-units by recalculating the center of each of said device spots based on said spatial offset and determining whether a distance of the respective one of said sub-units to the recalculated center of each of a plurality of said device spots centered on adjacent ones of said second addressable units is within the radius of the respective one of said device spots.

26. The system of claim 23, wherein each of said device spots is substantially circular and has a radius, each of said second addressable units is substantially rectangular and has four corners, and each of said device spots has a center substantially centered on one of the corners of one of said second addressable units, said means (d)(ii) including means for determining which of said device spots overlaps each of said sub-units by determining whether a distance of the respective one of said sub-units to the center of each of a plurality of said device spots centered on the corners of said prototype addressable unit is within the radius of the respective one of said device spots.

27. The system of claim 26, wherein said device model is further defined by a degree of misregistration between said N color separation bitmaps, said misregistration producing a spatial offset between said device spots addressed to said second addressable units, said means (d)(ii) including means for determining which of said device spots overlaps each of said sub-units by recalculating the center of each of said device spots based on said spatial offset and determining whether a distance of the respective one of said sub-units to the recalculated center of each of a plurality of said device spots centered on the corners of said prototype addressable unit is within the radius of the respective one of said device spots.

28. The system of claim 23, wherein said means (d)(iii) includes means for determining, for each of said second addressable units, the one of said $2^N$ different colors formed in each of the overlap regions of the respective one of said second addressable units by determining the one of said N different device spot colors associated with each of the device spots overlapping the respective one of said overlap regions, and determining the one of said $2^N$ different colors formed within the respective one of said overlap regions based on a combination of the N different device spot colors associated with the device spots overlapping the respective one of said overlap regions.

29. The system of claim 22, wherein said means (f) includes means for calculating said set of color values by using said fractional values as weighting coefficients in the Neugebauer equations.

30. The system of claim 22, wherein said halftone device model is further defined by a set of measured CIE X, Y, and Z tristimulus component values for each of said $2^N$ different colors, and the set of color values calculated by said means (g) for each of said second addressable units is a set of CIE X, Y, and Z tristimulus values, said means (g) using said fractional values as weighting coefficients in the Neugebauer equations, wherein said means (g) further includes:

means for multiplying each of the X tristimulus component values, Y tristimulus component values, and Z tristimulus component values by the fractional value calculated for the respective one of said $2^N$ different colors, thereby generating X tristimulus component value products, Y tristimulus component value products, and Z tristimulus component value products;

means for summing the X tristimulus component value products to calculate the X tristimulus value;

means for summing the Y tristimulus component value products to calculate the Y tristimulus value; and means for summing the Z tristimulus component value products to calculate the Z tristimulus value.

31. The system of claim 30, wherein said continuous-tone device is a continuous-tone printer, said printer being capable of producing one of said continuous range of colors at each of said first addressable units by deposition of a plurality of different colorants, wherein said means (g) for controlling said continuous-tone device includes:

means for generating colorant values for each of said first addressable units based on the X, Y, and Z tristimulus values calculated for one or more of said second addressable units; and means for controlling said continuous-tone printer to deposit said different colorants at each of said first addressable units in amounts determined by the colorant values generated for the respective one of said first addressable units.

32. The system of claim 30, wherein said continuous-tone device is a continuous-tone monitor, said continuous-tone monitor being capable of producing one of said continuous range of colors at each of said first addressable units by excitation of differently colored elements associated with each of said first addressable units, wherein said means (g) for controlling said continuous-tone device includes:

means for generating element values for each of said first addressable units based on the X, Y, and Z tristimulus values calculated for one or more of said second addressable units; and means for controlling said continuous-tone monitor to excite said differently colored elements at each of said first addressable units with intensities determined by said element values generated for the respective one of said first addressable units.

33. The system of claim 22, wherein a number of said second addressable units is greater than a number of said first addressable units, said means (g) for controlling said continuous-tone device further comprising means for applying a filter kernel function to the sets of color values calculated for said second addressable units to scale down an addressability of said sets of said color values to match an addressability of said first addressable units, and controlling said continuous-tone device to produce one of said continuous range of colors at each of said first addressable units based on the resulting scaled-down sets of color values.

34. The system of claim 33, wherein said means for applying said filter kernel function means for applying a bicubic filter kernel function a plurality of times to the sets of color values calculated for said second addressable units.

35. A system for emulating a halftone printed image on a continuous-tone device, said image being defined by N color separation bitmaps, and said continuous-tone device being capable of producing one of a continuous range of colors at each of a plurality of first addressable units, the system comprising:

(a) means for constructing a halftone device model defined by a plurality of second addressable units and a plurality of device spots, wherein each of said second addressable units defines a substantially rectangular area having four corners, wherein each of said device spots is a substantially circular device spot having a radius, wherein each of said device spots, when addressed, has a center substantially centered on one of the corners of one of said second addressable units, and wherein said device spots have sizes greater than sizes of said second addressable units such that said device spots produce a plurality of overlap regions within each of said second addressable units when addressed to said second addressable units;

(b) means for addressing said device spots to said second addressable units based on said N color separation bitmaps, wherein each of said device spots is assigned one of N different colors determined by colors associated with said N color separation bitmaps, said device spots forming, with said overlap regions, a maximum of $2^N$ different colors within each of said second addressable units;

(c) means for dividing each of said second addressable units into a plurality of overlap regions;

(d) means for determining, for each of said second addressable units, the one of said $2^N$ different colors formed within each of said overlap regions in the respective one of said second addressable units;

(e) means for calculating, for each of said second addressable units, fractional values for each of said $2^N$ different colors formed within said overlap regions in the respective one of the second addressable units, the fractional values being calculated based on a ratio of the sums of areas of the respective overlap regions in which the respective one of said $2^N$ different colors is formed to a total area of the respective one of the second addressable units;

(f) means for calculating a set of color values for each of said second addressable units based on the fractional values calculated for each of said $2^N$ different colors formed in the respective one of said second addressable units; and (g) means for controlling said continuous-tone device to produce one of said continuous range of colors at each of said first addressable units based on the set of color values calculated for one or more of said second addressable units, thereby emulating said halftone printed image on said continuous-tone device.

36. The system of claim 35, wherein said means (d) for determining the one of said $2^N$ different colors formed within each of said overlap regions includes means for determining which of said device spots overlaps the respective one of said overlap regions, determining the one of said N different device spot colors associated with each of the device spots overlapping the respective one of said overlap regions, and determining the one of said $2^N$ different colors formed within the respective one of said overlap regions based on a combination of the N different device spot colors associated with the device spots overlapping the respective one of said overlap regions.

37. The system of claim 35, wherein said means (f) includes means for calculating said set of color values by using said fractional values as weighting coefficients in the Neugebauer equations.

38. The system of claim 35, wherein said halftone device model is further defined by a set of measured CIE X, Y, and Z tristimulus component values for each of said $2^N$ different colors, and the set of color values calculated by said means (g) for each of said second addressable units is a set of CIE X, Y, and Z tristimulus values, said means(g) using said fractional values as weighting coefficients in the Neugebauer equations, wherein said means (g) further includes:

means for multiplying each of the X tristimulus component values, Y tristimulus component values, and Z tristimulus component values by the fractional value calculated for the respective one of said $2^N$ different colors, thereby generating X tristimulus component value products, Y tristimulus component value products, and Z tristimulus component value products;

means for summing the X tristimulus component value products to calculate the X tristimulus value;

means for summing the Y tristimulus component value products to calculate the Y tristimulus value; and means for summing the Z tristimulus component value products to calculate the Z tristimulus value.

39. The system of claim 38, wherein said continuous-tone device is a continuous-tone printer, said printer being capable of producing one of said continuous range of colors at each of said first addressable units by deposition of a plurality of different colorants, wherein said means (g) for controlling said continuous-tone device includes:

means for generating colorant values for each of said first addressable units based on the X, Y, and Z tristimulus values calculated for one or more of said second addressable units; and means for controlling said continuous-tone printer to deposit said different colorants at each of said first addressable units in amounts determined by the colorant values generated for the respective one of said first addressable units.

40. The system of claim 38, wherein said continuous-tone device is a continuous-tone monitor, said continuous-tone monitor being capable of producing one of said continuous range of colors at each of said first addressable units by excitation of differently colored elements associated with each of said first addressable units, wherein said means (g) for controlling said continuous-tone device includes:

means for generating element values for each of said first addressable units based on the X, Y, and Z tristimulus values calculated for one or more of said second addressable units; and means for controlling said continuous-tone monitor to excite said differently colored elements at each of said first addressable units with intensities determined by said element values generated for the respective one of said first addressable units.

41. The system of claim 35, wherein a number of said second addressable units is greater than a number of said first addressable units, said means (g) for controlling said continuous-tone device further comprising means for applying a filter kernel function to the sets of color values calculated for said second addressable units to scale down an addressability of said sets of said color values to match an addressability of said first addressable units, and controlling said continuous-tone device to produce one of said continuous range of colors at each of said first addressable units based on the resulting scaled-down sets of color values.

42. The system of claim 35, wherein said means for applying said filter kernel function includes means for applying a bicubic filter kernel function a plurality of times to the sets of color values calculated for said second addressable units.

* * * * *